(12) United States Patent
Berger et al.

(10) Patent No.: US 11,611,403 B2
(45) Date of Patent: Mar. 21, 2023

(54) AVERAGE ENVIRONMENTAL CHANNEL ESTIMATION

(71) Applicant: QUALCOMM Incorporated, San Diego, CA (US)

(72) Inventors: Peer Berger, Hod Hasharon (IL); Shay Landis, Hod Hasharon (IL); Moshe Ben-Ari, Rehovot (IL); Amit Bar-Or Tillinger, Petach Tikva (IL); Michael Levitsky, Rehovot (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 17/009,502

(22) Filed: Sep. 1, 2020

(65) Prior Publication Data

US 2022/0069929 A1     Mar. 3, 2022

(51) Int. Cl.
| | |
|---|---|
| *H04B 17/364* | (2015.01) |
| *H04B 17/382* | (2015.01) |
| *H04L 5/00* | (2006.01) |

(52) U.S. Cl.
CPC ......... *H04B 17/364* (2015.01); *H04B 17/382* (2015.01); *H04L 5/0048* (2013.01)

(58) Field of Classification Search
CPC .... H04B 17/364; H04B 17/382; H04L 5/0048
See application file for complete search history.

(56) References Cited

U.S. PATENT DOCUMENTS

| | | | |
|---|---|---|---|
| 2009/0016455 A1* | 1/2009 | Hoejen-Soerensen | H04L 25/0216 375/260 |
| 2013/0230128 A1* | 9/2013 | Tsai | H04L 27/2692 375/340 |
| 2014/0301301 A1* | 10/2014 | Cheng | H04L 5/00 370/329 |
| 2019/0260447 A1* | 8/2019 | Nam | H04L 27/2655 |
| 2021/0314885 A1* | 10/2021 | Kwak | H04W 72/042 |

FOREIGN PATENT DOCUMENTS

WO    WO-2020229902 A1 * 11/2020

\* cited by examiner

*Primary Examiner* — Melvin C Marcelo
*Assistant Examiner* — Natali Pascual Peguero
(74) *Attorney, Agent, or Firm* — Holland & Hart LLP

(57) ABSTRACT

Methods, systems, and devices for wireless communications are described for estimating one or more environmental factors at a first user equipment (UE). The one or more environmental factors may be based on estimates of a Doppler spread and a power delay profile (PDP) taken over a set of subsets of a time period, based on multiple signals received from a second UE or a base station over the time period. The first UE may estimate the Doppler spread and PDP for a channel over each of the set of subsets of the time period, and may combine the Doppler spread over the set of subsets and combine the PDP over the set of subsets. The first UE may use the combined Doppler spread and the combined PDP to determine one or more communication parameters for the channel.

30 Claims, 10 Drawing Sheets

AVERAGE ENVIRONMENTAL CHANNEL ESTIMATION

FIELD OF TECHNOLOGY

The following relates to wireless communications, including average environmental channel estimation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may experience decreased communication quality over a channel based on one or more aspects of the communication channel or its environment. The decreased communication quality may increase power consumption at the UE, while decreasing throughput and reliability.

SUMMARY

The described techniques relate to improved methods, systems, devices, and apparatuses that support environmental channel estimation. Generally, the described techniques provide for estimating one or more environmental factors (e.g., to characterize a channel) at a first user equipment (UE). The one or more environmental factors may be based on estimates of a Doppler spread and a power delay profile (PDP) taken over a set of subsets of a time period, based on multiple signals received from a second UE or a base station during the set of subsets. In some examples, the time period may include multiple subframes and each subset of the time period may represent a subframe. The first UE may estimate the Doppler spread and PDP for a channel over each of the set of subsets of the time period, and may combine the Doppler spread over the set of subsets and combine the PDP over the set of subsets. The first UE may use the combined Doppler spread and the combined PDP to determine the one or more environmental factors of the channel. Based on the one or more environmental factors (e.g., that characterize the channel), the first UE may determine one or more communication parameters for the channel.

For example, the combined PDPs and/or the combined Doppler spreads may be used by the first UE to select channel estimation parameters. The first UE may additionally or alternatively use the channel characterization (e.g., the one or more environmental factors) to determine one or more communication parameters for transmitting communications to the second UE or the base station. The first UE may communicate (e.g., may receive or transmit a signal) with the second UE and/or the base station based on the one or more communication parameters.

A method of wireless communications at a UE is described. The method may include receiving, over a time period, a set of signals at the UE, estimating a Doppler spread for each subset of a set of subsets of the time period based on a first measurement of the set of signals, estimating, for each of the set of subsets of the time period, a power delay profile including an estimate of received powers over a corresponding subset of the time period based on a second measurement of the set of signals, combining the Doppler spreads over the time period and the power delay profiles over the time period, and determining one or more communication parameters based on the combined Doppler spreads and the combined power delay profiles.

An apparatus for wireless communications at a UE is described. The apparatus may include a processor, memory coupled with the processor, and instructions stored in the memory. The instructions may be executable by the processor to cause the apparatus to receive, over a time period, a set of signals at the UE, estimate a Doppler spread for each subset of a set of subsets of the time period based on a first measurement of the set of signals, estimate, for each of the set of subsets of the time period, a power delay profile including an estimate of received powers over a corresponding subset of the time period based on a second measurement of the set of signals, combine the Doppler spreads over the time period and the power delay profiles over the time period, and determine one or more communication parameters based on the combined Doppler spreads and the combined power delay profiles.

Another apparatus for wireless communications at a UE is described. The apparatus may include means for receiving, over a time period, a set of signals at the UE, estimating a Doppler spread for each subset of a set of subsets of the time period based on a first measurement of the set of signals, estimating, for each of the set of subsets of the time period, a power delay profile including an estimate of received powers over a corresponding subset of the time period based on a second measurement of the set of signals, combining the Doppler spreads over the time period and the power delay profiles over the time period, and determining one or more communication parameters based on the combined Doppler spreads and the combined power delay profiles.

A non-transitory computer-readable medium storing code for wireless communications at a UE is described. The code may include instructions executable by a processor to receive, over a time period, a set of signals at the UE, estimate a Doppler spread for each subset of a set of subsets of the time period based on a first measurement of the set of signals, estimate, for each of the set of subsets of the time period, a power delay profile including an estimate of received powers over a corresponding subset of the time period based on a second measurement of the set of signals, combine the Doppler spreads over the time period and the power delay profiles over the time period, and determine one or more communication parameters based on the combined Doppler spreads and the combined power delay profiles.

In some examples of the method, apparatuses, and non-transitory computer-readable medium described herein, combining the Doppler spreads over the time period and the power delay profiles over the time period may include operations, features, means, or instructions for determining, for the time period, one or more first values characterizing the Doppler spread and one or more second values characterizing the power delay profile.

In some examples of the method, apparatuses, and non-transitory computer-readable medium described herein, determining the one or more communication parameters may include operations, features, means, or instructions for identifying a classification associated with the set of signals based on the one or more first values, the one or more second values, or any combination thereof.

Some examples of the method, apparatuses, and non-transitory computer-readable medium described herein may further include operations, features, means, or instructions for determining whether the one or more first values satisfy a first threshold, where identifying the classification may be based on determining whether the one or more first values satisfy the first threshold, and determining whether to combine information from two or more demodulation reference signals over two or more symbols based on the classification.

Some examples of the method, apparatuses, and non-transitory computer-readable medium described herein may further include operations, features, means, or instructions for determining whether the one or more second values satisfy a second threshold, where identifying the classification may be based on determining whether the one or more second values satisfy the second threshold, and determining whether to combine information from two or more resource elements in a same symbol based on the classification.

Some examples of the method, apparatuses, and non-transitory computer-readable medium described herein may further include operations, features, means, or instructions for identifying, for the time period, one or more classifications associated with the set of signals based on the combined Doppler spreads and the combined power delay profiles.

In some examples of the method, apparatuses, and non-transitory computer-readable medium described herein, identifying the one or more classifications may include operations, features, means, or instructions for identifying, for the time period, a communication environment classification based on the combined power delay profiles and a mobility classification based on the combined Doppler spreads, where the mobility classification includes a dynamic classification or a static classification and the communication environment classification includes a rural classification or an urban classification.

In some examples of the method, apparatuses, and non-transitory computer-readable medium described herein, identifying the one or more classifications may include operations, features, means, or instructions for determining a majority vote for the one or more classifications.

In some examples of the method, apparatuses, and non-transitory computer-readable medium described herein, determining the majority vote may include operations, features, means, or instructions for determining, for the time period, a first number of Doppler spreads above a first threshold, determining, for the time period, a second number of power delay profiles above a second threshold, and identifying, for the time period, the one or more classifications based on the second number of power delay profiles and the first number of Doppler spreads.

In some examples of the method, apparatuses, and non-transitory computer-readable medium described herein, determining the one or more communication parameters may include operations, features, means, or instructions for determining, based on the combined power delay profiles, a first location in a time domain associated with communication of a signal and a second location in the time domain associated with noise reception.

In some examples of the method, apparatuses, and non-transitory computer-readable medium described herein, determining the one or more communication parameters may include operations, features, means, or instructions for identifying a delay spread based on the combined power delay profiles, and determining one or more reception parameters based on the delay spread, the combined Doppler spread, or any combination thereof.

In some examples of the method, apparatuses, and non-transitory computer-readable medium described herein, the one or more reception parameters include a filter value.

In some examples of the method, apparatuses, and non-transitory computer-readable medium described herein, determining the one or more communication parameters may include operations, features, means, or instructions for selecting a transmission scheme based on the combined Doppler spreads, the combined power delay profiles, or any combination thereof.

In some examples of the method, apparatuses, and non-transitory computer-readable medium described herein, estimating the Doppler spreads may include operations, features, means, or instructions for correlating, for each subset of the set of subsets of the time period, two demodulation reference signals of the set of signals.

In some examples of the method, apparatuses, and non-transitory computer-readable medium described herein, estimating the power delay profiles may include operations, features, means, or instructions for identifying, for each subset of the set of subsets of the time period, a power peak index and a power value for received powers above a threshold based on receiving the set of signals.

In some examples of the method, apparatuses, and non-transitory computer-readable medium described herein, the time period includes a set of subframes and each subset of the time period includes a subframe.

In some examples of the method, apparatuses, and non-transitory computer-readable medium described herein, the set of signals may be associated with cellular vehicle to everything (C-V2X) communications.

DETAILED DESCRIPTION

Figure 1:
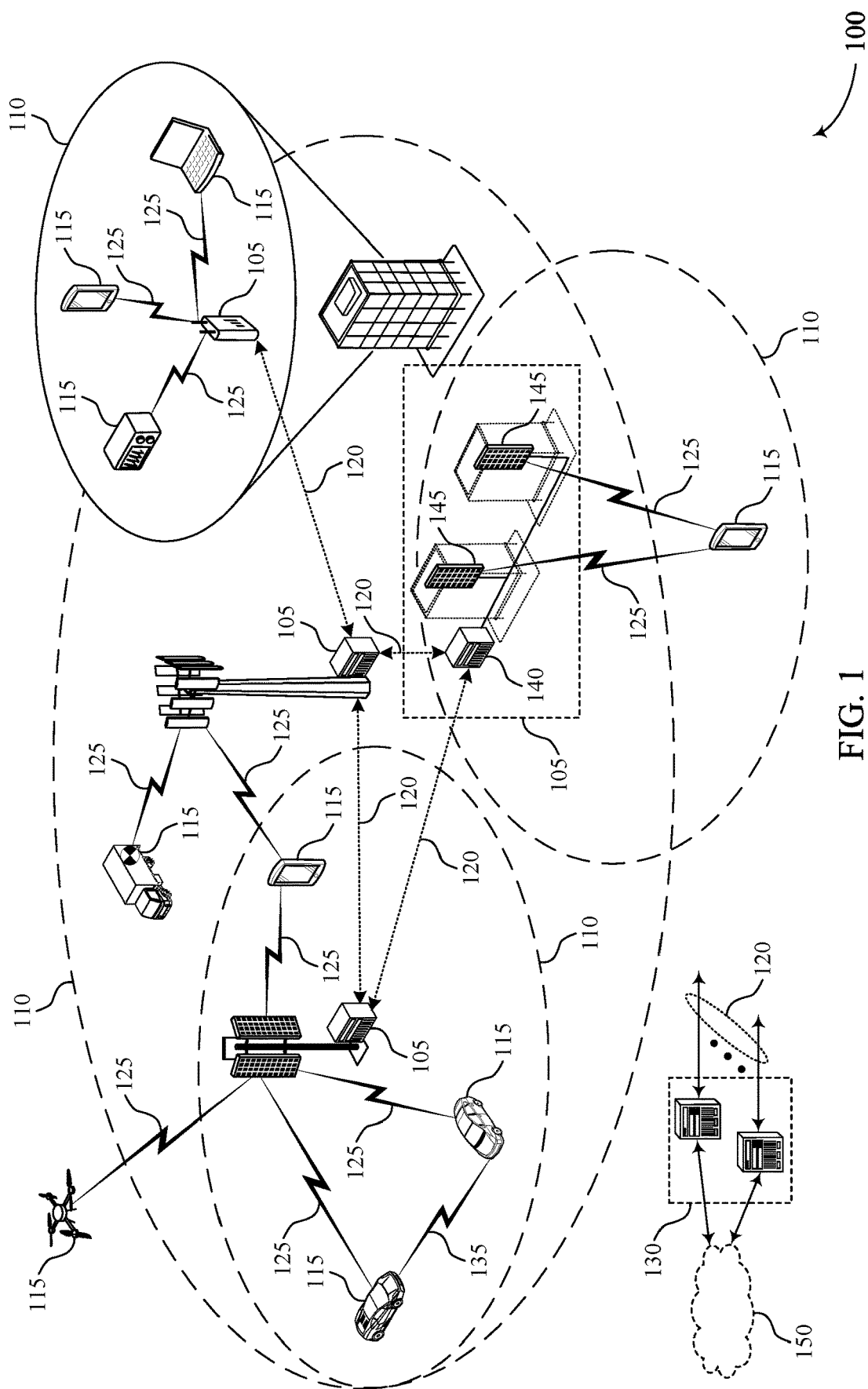
FIG. 1 illustrates an example of a wireless communications system that supports average environmental channel estimation in accordance with aspects of the present disclosure.

A first user equipment (UE) may communicate with a second UE over a sidelink channel and/or may communicate with a base station over another channel (e.g., an uplink or downlink channel), where a channel communication quality may be characterized by or based on one or more environmental factors. In one example, channel quality may be different in a rural environment and an urban environment, or may be different in a dynamic mobility environment or static mobility environment. Similarly, a channel power delay profile (PDP) may be based on one or more environmental factors (e.g., may change in an urban or a rural environment). In another example, a Doppler spread of a channel may be based on one or more mobility factors of an environment, where a higher mobility (e.g., a higher speed or velocity) may be associated with a higher Doppler spread.

Communication parameters for reception and/or transmission at the first UE may be based on information corresponding to an associated channel (e.g., based on channel estimation measurements). In some cases, the first UE may not be configured to characterize a channel based on the one or more environmental factors, and may not update or base associated communication parameters on the one or more environmental factors, which may result in decreased channel quality (e.g., and associated communication throughput and reliability). Similarly, the first UE may, in some cases, be configured to perform channel estimation or measurements over smaller time periods (e.g., one subframe), which may result in noisier estimates (e.g., less accurate estimates) or may increase degradation (e.g., signal degradation).

The present disclosure provides techniques for estimating one or more environmental factors (e.g., to characterize a channel) at the first UE. The one or more environmental factors may be based on estimates of a Doppler spread and a PDP taken over a set of subsets of a time period, based on multiple signals received from the second UE or the base station during the set of subsets. The set of subsets may represent each subset of the time period, or some of the subsets of the time period. In some examples, the time period may include multiple subframes and each subset of the time period may represent a subframe. The first UE may estimate the Doppler spread and PDP for a channel over each of the set of subsets of the time period, and may combine the Doppler spread over the set of subsets and combine the PDP over the set of subsets. The first UE may use the combined Doppler spread and the combined PDP to determine the one or more environmental factors of the channel. Based on the one or more environmental factors (e.g., that characterize the channel), the first UE may determine one or more communication parameters that may increase a reliability or quality of channel estimation for the channel, or may select a transmission scheme for the channel that may increase channel quality.

For example, the combined PDPs and/or the combined Doppler spreads may be used by the first UE to select channel estimation parameters. The first UE may additionally or alternatively use the channel characterization (e.g., the one or more environmental factors) to determine one or more communication parameters for transmitting communications to the second UE or the base station. In one example, the combined Doppler spreads and the combined PDPs may be used for selecting or determining a transmission scheme, such as a transmission diversity scheme (e.g., a transmit diversity scheme). The first UE may use the one or more communication parameters (e.g., signal reception parameters) to receive one or more signals from the second UE and/or the base station. Additionally or alternatively, the first UE may use the one or more communication parameters (e.g., signal transmission parameters) to transmit one or more signals to the second UE and/or the base station. Using the one or more communication parameters based on the channel characterization (e.g., the one or more environmental factors) may increase communication quality, reliability, and/or throughput.

Aspects of the disclosure are initially described in the context of wireless communications systems. Aspects of the disclosure are further illustrated by and described with reference to charts, a process flow, apparatus diagrams, system diagrams, and flowcharts that relate to average environmental channel estimation.

FIG. 1 illustrates an example of a wireless communications system 100 that supports average environmental channel estimation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, cellular V2X (C-V2X) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A first UE 115 may communicate with a second UE 115 over a sidelink channel and/or may communicate with a base station 105 over another channel (e.g., an uplink or downlink channel), where a channel communication quality may be characterized by one or more environmental factors. Communication parameters for reception and/or transmission at the first UE 115 may be based on information corresponding to an associated channel (e.g., based on channel estimation measurements). In some cases, the first UE 115 may not be configured to characterize a channel based on the one or more environmental factors, and may not update or base associated communication parameters on the one or more environmental factors, which may result in decreased channel quality (e.g., and associated communication throughput and reliability). Similarly, the first UE 115 may, in some cases, be configured to perform channel estimation or measurements over smaller time periods (e.g., one subframe), which may result in noisier estimates (e.g., less accurate estimates) or may increase degradation (e.g., signal degradation).

The present disclosure provides techniques for estimating one or more environmental factors (e.g., to characterize a channel) at the first UE 115. The one or more environmental factors may be based on estimates of a Doppler spread and a PDP taken over a set of subsets of a time period, based on multiple signals received from the second UE 115 or the base station 105 over the time period. The first UE 115 may estimate the Doppler spread and PDP for a channel over each of the set of subsets of the time period, and may combine the Doppler spread over the set of subsets and combine the PDP over the set of subsets. The first UE 115 may use the combined Doppler spread and the combined PDP to determine the one or more environmental factors of the channel. Based on the one or more environmental factors (e.g., that characterize the channel), the first UE 115 may determine one or more communication parameters that may increase a reliability or quality of channel estimation for the channel, or may select a transmission scheme for the channel that may increase channel quality.

Figure 2:
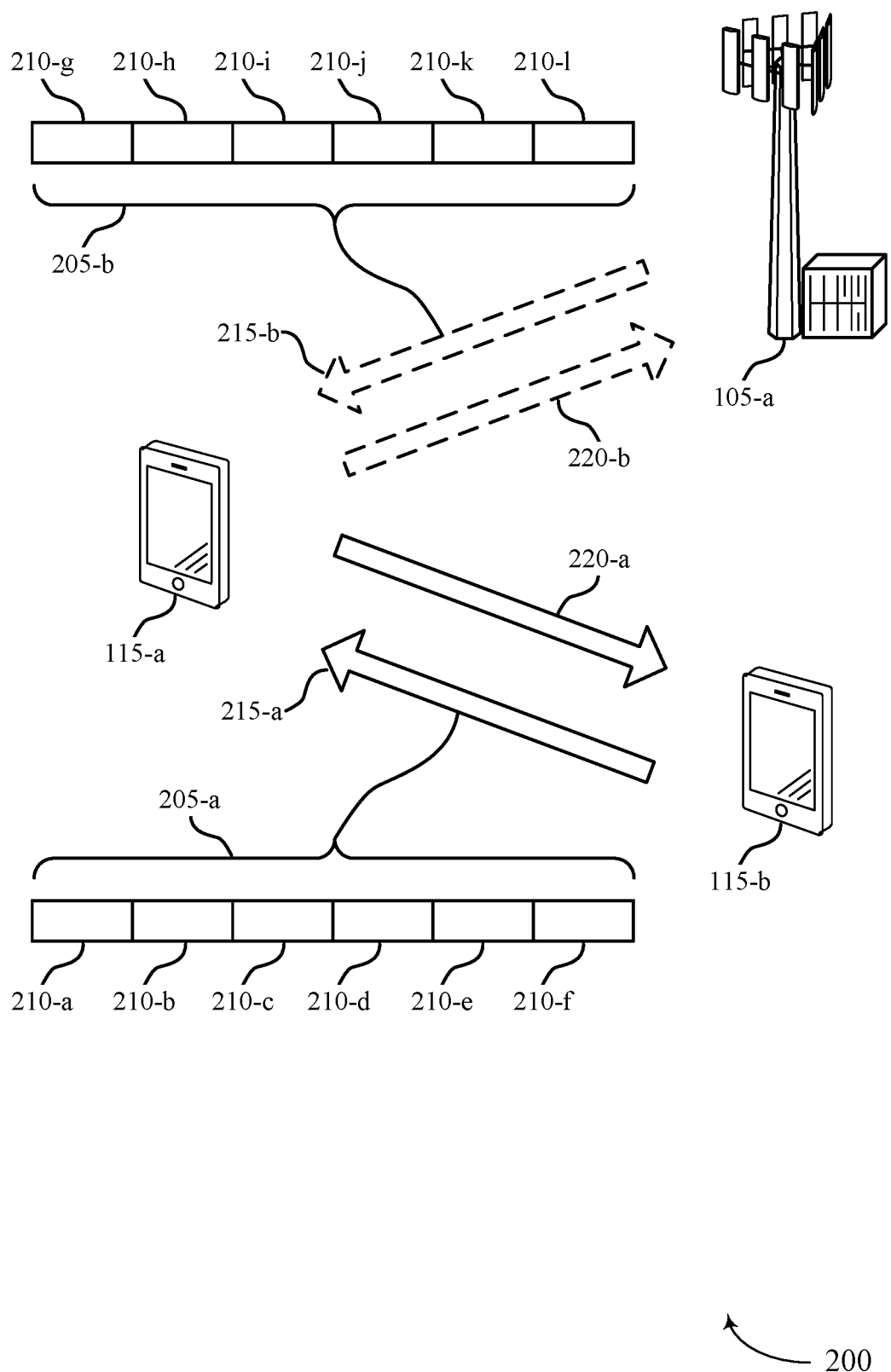
FIG. 2 illustrates an example of a wireless communications system that supports average environmental channel estimation in accordance with aspects of the present disclosure.

FIG. 2 illustrates an example of a wireless communications system 200 that supports average environmental channel estimation in accordance with aspects of the present disclosure. In some examples, wireless communications system 200 may implement aspects of wireless communications system 100. For example, wireless communications system 200 may include UEs 115-a and 115-b and a base station 105-a, which may represent respective examples of UEs 115 and a base station 105 described with reference to FIG. 1. UE 115-a may communicate with UE 115-b (e.g., over a sidelink channel), with base station 105-a (e.g., over a downlink or uplink channel), or with any combination thereof (e.g., among other wireless devices).

UE 115-a may communicate with UE 115-b over a sidelink channel and/or may communicate with base station 105-a over another channel (e.g., uplink or downlink channel). A channel communication quality may be characterized by or based on one or more environmental factors. In one example, channel quality may be different in a rural environment and an urban environment, or may be different in a dynamic mobility environment or static mobility environment. Channel communication quality may also be based on time (e.g., may change with time). Other environmental characteristics may also affect channel quality, among other channel characteristics. For example, a channel PDP may be based on one or more environmental factors (e.g., may change in an urban or a rural environment). The PDP may, for example, represent a characterization of different communication rays from a same communication that arrive at a receiver at different times (e.g., with different delays) and with different powers. In another example, a Doppler spread of a channel may be based on one or more mobility factors of an environment, where a higher mobility (e.g., a higher speed or velocity) may be associated with a higher Doppler spread.

Communication parameters for reception and/or transmission at UE 115-a may be based on information corresponding to an associated channel (e.g., based on channel estimation measurements). In some cases, UE 115-a may not be configured to characterize a channel based on the one or more environmental factors, and may not update or base associated communication parameters on the one or more environmental factors, which may result in a decrease in channel quality (e.g., and associated communication throughput and reliability). Similarly, UE 115-a may, in some cases, be configured to perform channel estimation or measurements over smaller time periods, which may result in noisier estimates or may increase degradation (e.g., signal degradation).

The present disclosure provides techniques for estimating one or more environmental factors (e.g., to characterize a channel) at UE 115-a. The one or more environmental factors may be based on estimates of a Doppler spread and a PDP taken over multiple subsets 210 of a time period 205, based on multiple signals received from UE 115-b or base station 105-a during the multiple subsets 210. In some examples, the time period 205 may include multiple subframes, where each subset 210 of the time period 205 may represent a subframe. The time period 205 may represent a time period 205 configured for UE 115-a, such as a transmission periodicity (e.g., 100 ms).

UE 115-a may estimate the Doppler spread and PDP for a channel over each of the multiple subsets 210 of the time period 205, and may combine the Doppler spread over the multiple subsets 210 and combine the PDP over the multiple subsets 210. UE 115-a may use the combined Doppler spread and the combined PDP to determine the one or more environmental factors of the channel, and, based on the one or more environmental factors (e.g., that characterize the channel) UE 115-a may determine one or more communication parameters that may increase a reliability of channel estimation for the channel, or may select a transmission scheme for the channel that may increase channel quality.

A Doppler spread may be estimated for a subset 210 of the time period 205 (e.g., a subframe) by a correlation between two or more demodulation reference signals (DMRSs) of the subset 210, among other examples. A PDP may be estimated for a subset 210, among other examples, by identifying a power peak index and a power value in a time domain for one or more received signals having a received power at UE 115-a that meets or exceeds a received power threshold. In a first example, UE 115-a may combine the Doppler spreads and combine the PDPs for each of the multiple subsets 210 by determining an average Doppler spread and an average PDP. In a second example, UE 115-a may combine the Doppler spreads and combine the PDPs by determining a classification for each of the Doppler spreads and a classification for each of the PDPs. UE 115-a may determine a majority vote based on the classifications, for example, by determining, for the channel, one or more classifications indicated by a majority of the Doppler spreads, a majority of the PDPs, or a combination thereof.

In one example, UE 115-a may determine a first classification associated with a majority of the PDPs and a second classification associated with a majority of the Doppler spreads, and may characterize the channel using the first and second classifications. In another example, UE 115-a may determine a first classification associated with a majority of the PDPs and a second classification associated with a majority of the Doppler spreads, and may characterize the channel using the first or second classification associated with the higher number of subsets 210.

In some cases, a higher combined Doppler spread (e.g., above or meeting a threshold) or a majority of Doppler spreads above a threshold may indicate or classify the channel as a dynamic mobility channel. Similarly, a lower combined Doppler spread (e.g., below a threshold) or a majority of Doppler spreads below a threshold may indicate or classify the channel as a static mobility channel. A higher combined PDP (e.g., above or meeting a threshold) or a majority of PDPs above a threshold may indicate or classify the channel as an urban channel. Similarly, a lower combined PDP spread (e.g., below a threshold) or a majority of PDPs below a threshold may indicate or classify the channel as a rural channel. While the classifications described herein indicate a location classification and a mobility classification, it is to be understood that the classifications are not limited to such and may include any classification of the channel based on the combined Doppler spreads and the combined PDPs.

UE 115-a may additionally or alternatively use the combined Doppler spreads to determine or identify a Doppler spread for the channel (e.g., to characterize the channel), where the Doppler spread may represent or indicate a low Doppler spread or a high Doppler spread channel. In some cases, UE 115-a may make such a determination based on the combined Doppler spreads exceeding or meeting a threshold, among other examples. Similarly, UE 115-a may additionally or alternatively use the combined PDPs to determine or identify a delay spread for the channel (e.g., to characterize the channel), where the delay where the delay spread may represent or indicate a low delay spread or a high delay spread channel. In some cases, UE 115-a may also make such a determination based on the combined PDPs exceeding or meeting a threshold, among other examples.

As described herein, UE 115-a may use the channel characterization (e.g., the one or more environmental factors) to determine one or more communication parameters for receiving communications from UE 115-b or base station 105-a. For example, in a low Doppler spread channel (e.g., based on one or more classifications assigned by UE 115-a), UE 115-a may determine to combine information from two or more demodulation reference signal (DMRS) symbols to increase processing gain (e.g., because of a large time coherency or smaller change in time indicated by the low Doppler spread). In a high Doppler spread channel, UE 115-a may determine to refrain from combining information from two or more DMRS symbols, for example, because doing so may increase degradation based on increased error (e.g., model error).

Similarly, in a low delay spread channel (e.g., a low root mean square (RMS) delay spread classification), UE 115-a may determine to combine information from two or more adjacent resource elements (REs) (e.g., adjacent symbols) to increase processing gain (e.g., because of a large bandwidth coherency indicated by the low delay spread). In a high delay spread channel, UE 115-a may determine to refrain from combining information from two or more adjacent REs, for example, because doing so may increase degradation based on increased error (e.g., model error).

When determining the one or more communication parameters for reception of signals at UE 115-a, the combined PDPs and the combined Doppler spreads may also be used by UE 115-a to select channel estimation parameters. For example, UE 115-a may determine where, in a time domain, to look for a signal to receive and where noise may exist. UE 115-a may also determine one or more channel estimation parameters based on the combined PDPs, as further described herein with reference to FIG. 3A.

UE 115-a may additionally or alternatively use the channel characterization (e.g., the one or more environmental factors) to determine one or more communication parameters for transmitting communications to UE 115-b or base station 105-a. In one example, the combined Doppler spreads and the combined PDPs may be used for selecting or determining a transmission scheme, such as selecting between a cyclic delay diversity (CDD) scheme and an advanced space diversity (ASD) scheme. The combined Doppler spreads and the combined PDPs may, for example, indicate information about gains or degradation of a transmission scheme within the channel, which may support selection of a higher gain or lower degradation scheme (e.g., based on the one or more channel characteristics). Using the combined Doppler spreads and the combined PDPs to determine a transmission scheme is further described herein with reference to FIG. 3B.

UE 115-a may use the one or more communication parameters to receive one or more signals 215 from UE 115-b and/or base station 105-a. Additionally or alternatively, UE 115-a may use the one or more communication parameters to transmit one or more signals 220 to UE 115-b and/or base station 105-a. Using the one or more communication parameters based on the channel characterization (e.g., the one or more environmental factors) may increase communication quality, reliability, and/or throughput.

Figure 3A:
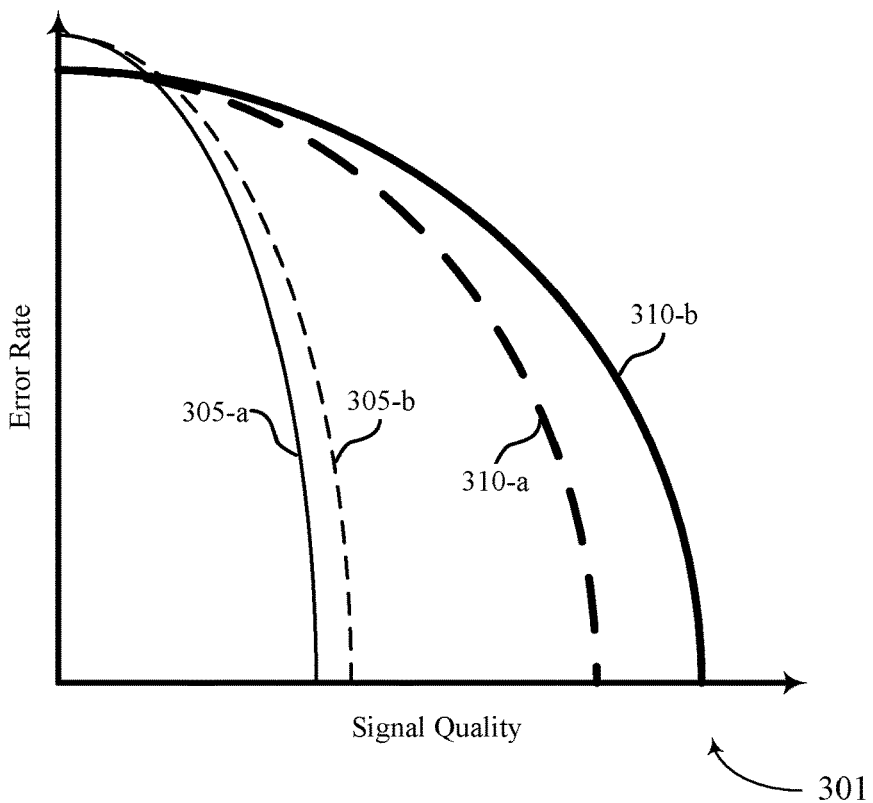
FIGS. 3A and 3B illustrate examples of charts that support average environmental channel estimation in accordance with aspects of the present disclosure.
Figure 3B:
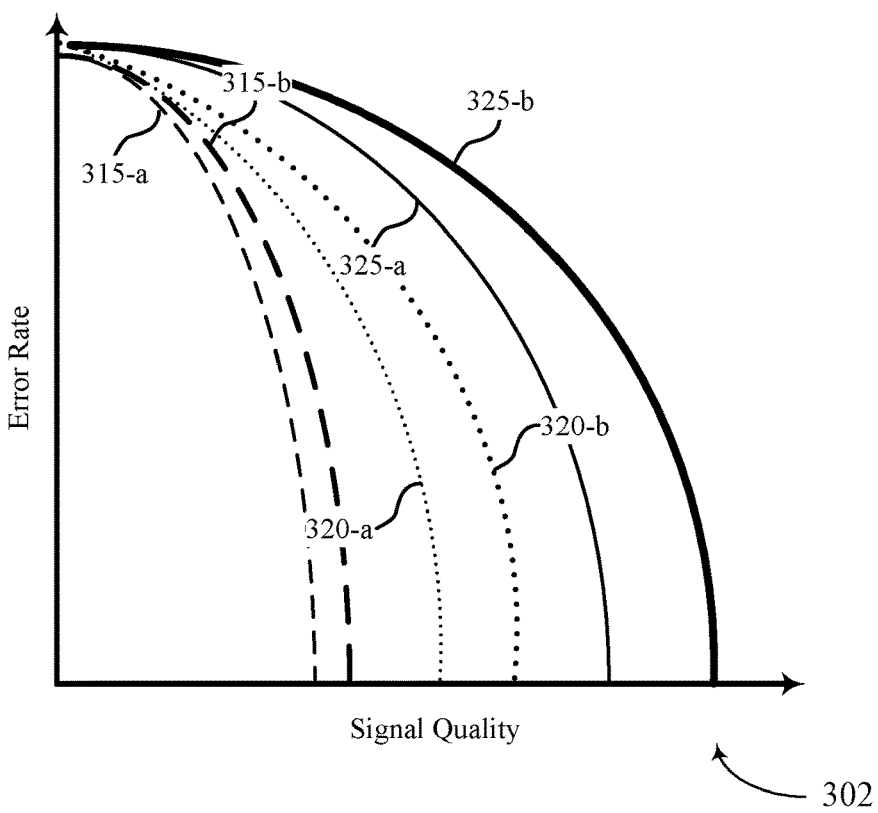

FIGS. 3A and 3B illustrate examples of charts 301 and 302 that support average environmental channel estimation in accordance with aspects of the present disclosure. In some examples, charts 301 and 302 may implement or be implemented by aspects of wireless communications system 100 or 200. For example, a UE 115 may use either or both of charts 301 and 302 to determine one or more communication parameters for a channel, based on one or more environmental factors that characterize the channel. The UE 115 may represent an example of a UE 115 described with reference to FIGS. 1 and 2. The UE 115 may, for example, determine the one or more environmental factors (e.g., may characterize the channel) based on one or more combined channel values, such as a combined Doppler spread and/or a combined PDP, as described with reference to FIG. 2. The UE 115 may use the one or more combined channel values to determine the one or more communication parameters for the channel.

Charts 301 and 302 may illustrate relationships of an error rate (e.g., a block error rate (BLER)) to a signal quality (e.g., a signal quality measurement, such as a signal to noise ratio (SNR)) for different channels and different communication parameters (e.g., transmission schemes or channel estimation parameters), where the communication parameters may be based on assumptions of a delay spread or a Doppler spread. In some examples, charts 301 and 302 may be based on the one or more combined channel values as measured or determined over a time period (e.g., combined PDPs and/or combined Dopplers). In some cases, the relationships included in charts 301 and 302 may represent generalized or approximate (e.g., not exact) relationships between the error rate and the signal quality.

In the example of chart 301, relationships 305-a and 305-b may represent a first channel and relationships 310-a and 310-b may represent a second channel. Relationship 305-a may represent reception on the first channel, with estimation parameters based on a small delay spread (e.g., or small Doppler spread), and relationship 305-b may represent reception on the first channel, with estimation parameters based on a large delay spread (e.g., or large Doppler spread). Relationship 310-a may represent reception on the second channel, with estimation parameters based on a large delay spread (e.g., or large Doppler spread), and relationship 310-b may represent reception on the second channel, with estimation parameters based on a small delay spread (e.g., or small Doppler spread).

In the example of chart 302, relationships 315-a and 315-b may represent a first channel, relationships 320-a and 320-b may represent a second channel, and relationships 325-a and 325-b may represent a third channel. Relationship 315-a may represent transmission on the first channel using a first transmission scheme (e.g., based on Doppler spread or delay spread assumptions), and relationship 315-b may represent transmission on the first channel using a second transmission scheme (e.g., based on different Doppler spread or delay spread assumptions). Similarly, relationship 320-a may represent transmission on the second channel using the first transmission scheme, and relationship 320-b may represent transmission on the second channel using the second transmission scheme. Relationship 325-a may represent transmission on the third channel using the second transmission scheme, and relationship 325-b may represent transmission on the third channel using the first transmission scheme. In some cases, the first transmission scheme may represent an ASD scheme and the second transmission scheme may represent a CDD scheme.

If the UE 115 is unaware of the channel characterization (e.g., a high or low delay spread or Doppler spread), the UE 115 may set the communication parameters (e.g., channel estimation parameters or a transmission scheme) for the first, second, or third channel based on an assumed delay spread or Doppler spread, or based on an intermediate delay spread or Doppler spread. Setting the communication parameters in this manner may increase a signal quality to achieve a defined error rate, which may result in the UE 115 spending greater time and/or power to achieve the increased signal quality. The UE 115 may therefore use the characterization of a channel (e.g., as described with reference to FIG. 2) to determine one or more communication parameters that may support achieving the defined error rate at a lower signal quality (e.g., signal measurement).

In a first example, the UE 115 may use a channel characterization to determine channel estimation parameters (e.g., for receiving one or more signals) based on chart 301, or a chart similar to chart 301. The UE 115 may use a delay spread (e.g., determined from the combined PDPs), a combined Doppler spread, or any combination thereof, to characterize the channel. For example, the UE 115 may determine whether the channel may be characterized as a low or high delay spread and/or a low or high Doppler spread. The UE 115 may use the characterization to determine channel estimation parameters to achieve the defined error rate at a lower signal quality (e.g., identified using a signal measurement).

For example, for the first channel, the UE 115 may determine to use channel estimation parameters corresponding to relationship 305-a (e.g., to achieve a defined error rate at a lower signal quality), which may be associated with a small delay spread or Doppler spread. Similarly, for the second channel, the UE 115 may determine to use channel estimation parameters corresponding to relationship 310-a (e.g., to achieve a defined error rate at a lower signal quality), which may be associated with a large delay spread or Doppler spread. In these and other cases, the UE 115 may use less power or time to achieve a defined error rate based on characterizing the channel.

In a second example, the UE 115 may use a channel characterization to determine a transmission scheme (e.g., for transmitting one or more signals) based on chart 302, or a chart similar to chart 302. The UE 115 may use a delay spread (e.g., determined from the combined PDPs), a combined Doppler spread, or any combination thereof, to characterize the channel. For example, the UE 115 may determine whether the channel may be characterized as a low or high delay spread and/or a low or high Doppler spread. The UE 115 may use the characterization to determine a transmission scheme to achieve the defined error rate at a lower signal quality (e.g., identified using a signal measurement).

For example, for the first channel, the UE 115 may determine to use the first transmission scheme corresponding to relationship 315-a (e.g., to achieve the defined error rate at a lower signal quality), which may be associated with a given delay spread or Doppler spread. Similarly, for the second channel, the UE 115 may determine to use the first transmission scheme corresponding to relationship 320-a (e.g., to achieve the defined error rate at a lower signal quality), which may be associated with a given delay spread or Doppler spread. For the third channel, the UE 115 may determine to use the second transmission scheme corresponding to relationship 325-a (e.g., to achieve the defined error rate at a lower signal quality), which may be associated with a given delay spread or Doppler spread. In these and other cases, the UE 115 may therefore use less power or time to achieve a defined error rate based on characterizing the channel.

Figure 4:
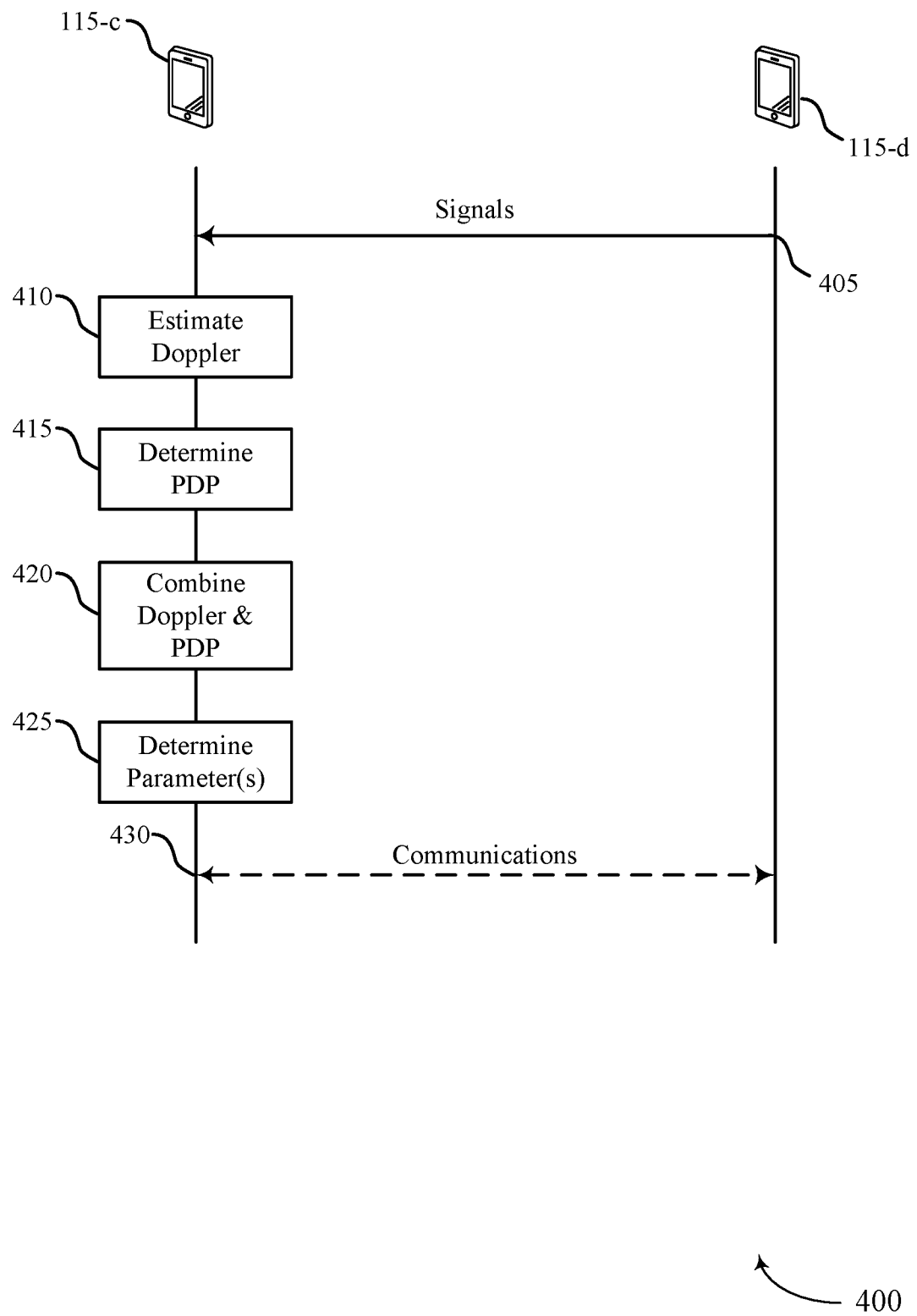
FIG. 4 illustrates an example of a process flow that supports average environmental channel estimation in accordance with aspects of the present disclosure.

FIG. 4 illustrates an example of a process flow 400 that supports average environmental channel estimation in accordance with aspects of the present disclosure. In some examples, process flow 400 may implement or be implemented by aspects of wireless communications system 100 or 200. For example, process flow 400 may be implemented by UEs 115-c and 115-d, which may represent examples of UEs 115 described with reference to FIGS. 1-3. Some aspects of process flow 400 may implement or be implemented by aspects of charts 301 and 302. UE 115-c may implement aspects of process flow 400 to characterize a channel (e.g., determine one or more environmental characteristics of the channel) and determine one or more communication parameters based on the channel characterization.

In the following description of process flow 400, the operations between UE 115-c and UE 115-d may be transmitted in a different order than the order shown, or the operations performed by UE 115-c and UE 115-d may be performed in different orders or at different times. For example, specific operations may also be left out of process flow 400, or other operations may be added to process flow 400. Although UE 115-c and UE 115-d are shown performing the operations of process flow 400, some aspects of some operations may also be performed by one or more other wireless devices. For example, some aspects of operations performed by UE 115-d may be performed by a base station 105 as described herein.

At 405, UE 115-c may receive, over a time period, multiple signals (e.g., from UE 115-d). The multiple signals may represent reference signals, downlink signals, sidelink signals, or any combination thereof (e.g., among other examples).

At 410, UE 115-c may estimate a Doppler spread for each subset (e.g., subframe) of a set of subsets of the time period based on a first measurement of the multiple signals. For example, UE 115-c may estimate the Doppler spreads by correlating two or more DMRSs, among other examples.

At 415, UE 115-c may estimate, for each of the set of subsets of the time period, a PDP based on a second measurement of the multiple signals. As described herein, each PDP may include an estimate of received powers over a corresponding subset of the time period (e.g., an estimate of delays between signal powers received at UE 115-c).

At 420, UE 115-c may combine the Doppler spreads over the time period. UE 115-c may also combine the PDPs over the time period. In one example, UE 115-c may combine the Doppler spreads and combine the PDPs over the time period by taking an average Doppler spread and an average PDP over the time period. Additionally or alternatively, UE 115-c may combine the Doppler spreads and combine the PDPs over the time period by taking a majority vote or by otherwise using the Doppler spreads and PDPs to identify one or more classifications associated with the multiple signals (e.g., determine a channel characterization of a channel associated with the multiple signals).

At 425, UE 115-c may determine one or more communication parameters based on the combined Doppler spreads and the combined PDPs. For example, UE 115-c may determine one or more channel estimation parameters based on the combined Doppler spreads and the combined PDPs as described herein. Additionally or alternatively, UE 115-c may determine a transmission scheme (e.g., a transmission diversity scheme or transmit diversity scheme) based on the combined Doppler spreads and the combined PDPs as described herein.

At 430, UE 115-c may communicate with UE 115-d using the one or more communication parameters. For example, UE 115-c may receive a communication from UE 115-d using the one or more channel estimation parameters or may transmit a communication to UE 115-d using the transmission scheme. The communications may experience an increased quality, throughput, and/or reliability based on the one or more communication parameters.

Figure 5:
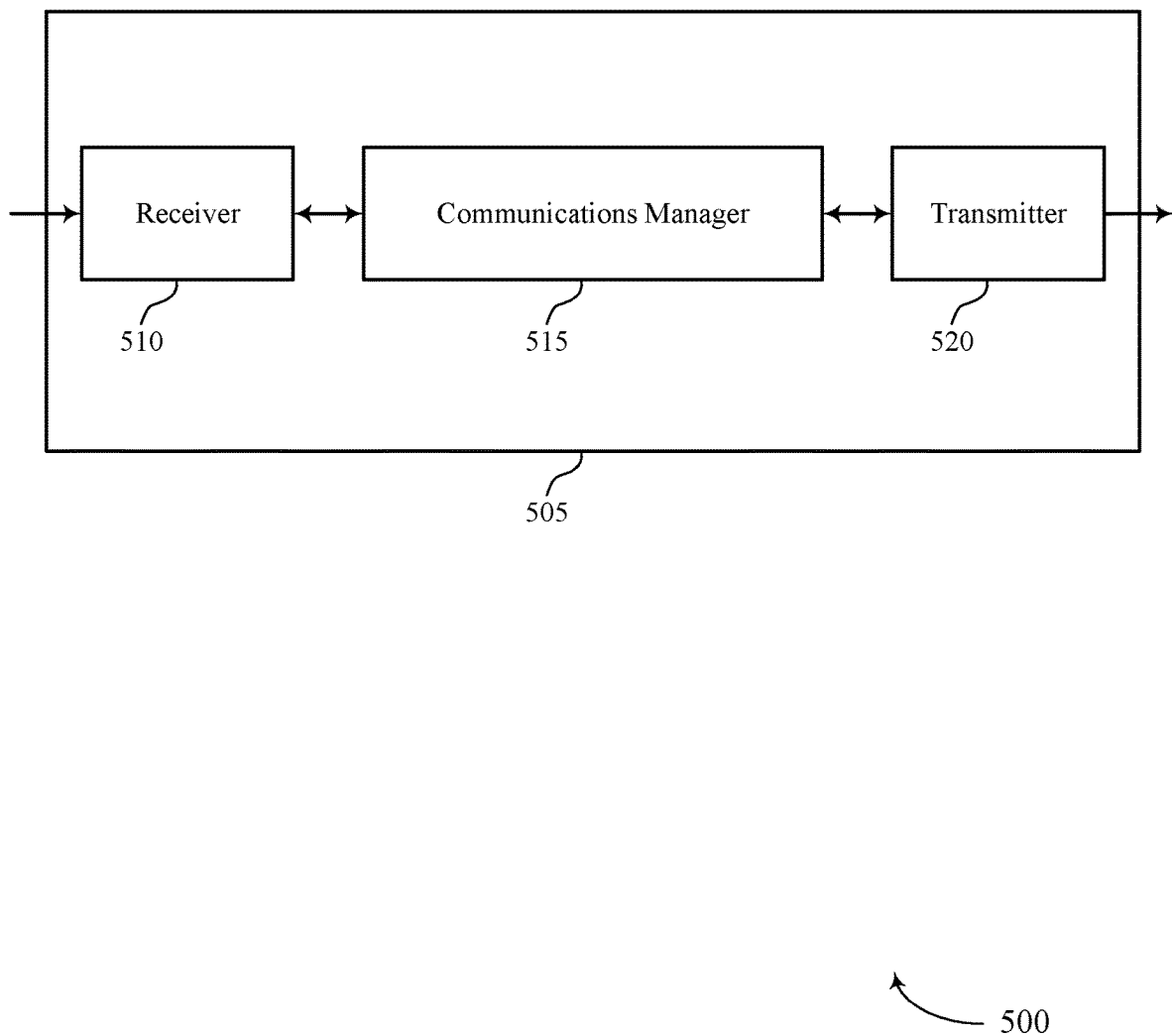
FIGS. 5 and 6 show block diagrams of devices that support average environmental channel estimation in accordance with aspects of the present disclosure.

FIG. 5 shows a block diagram 500 of a device 505 that supports average environmental channel estimation in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to average environmental channel estimation, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, over a time period, multiple signals at the UE, estimate a Doppler spread for each subset of a set of subsets of the time period based on a first measurement of the multiple signals, estimate, for each of the set of subsets of the time period, a PDP including an estimate of received powers over a corresponding subset of the time period based on a second measurement of the multiple signals, combine the Doppler spreads over the time period and the PDPs over the time period, and determine one or more communication parameters based on the combined Doppler spreads and the combined PDPs. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The actions performed by the communications manager 515, among other examples herein, may be implemented to realize one or more potential advantages. For example, communications manager 515 may increase available battery power, communication quality, and data throughput at a wireless device (e.g., a UE 115) by supporting estimation of one or more combined channel parameters and selection of one or more communication parameters based on the one or more combined channel parameters. The increase in communication quality and data throughput may result in increased link performance and decreased overhead based on the selection of the one or more communication parameters. Accordingly, communications manager 515 may save power and increase battery life at a wireless device (e.g., a UE 115) by strategically increasing a quality of communications at a wireless device (e.g., a UE 115).

Figure 6:
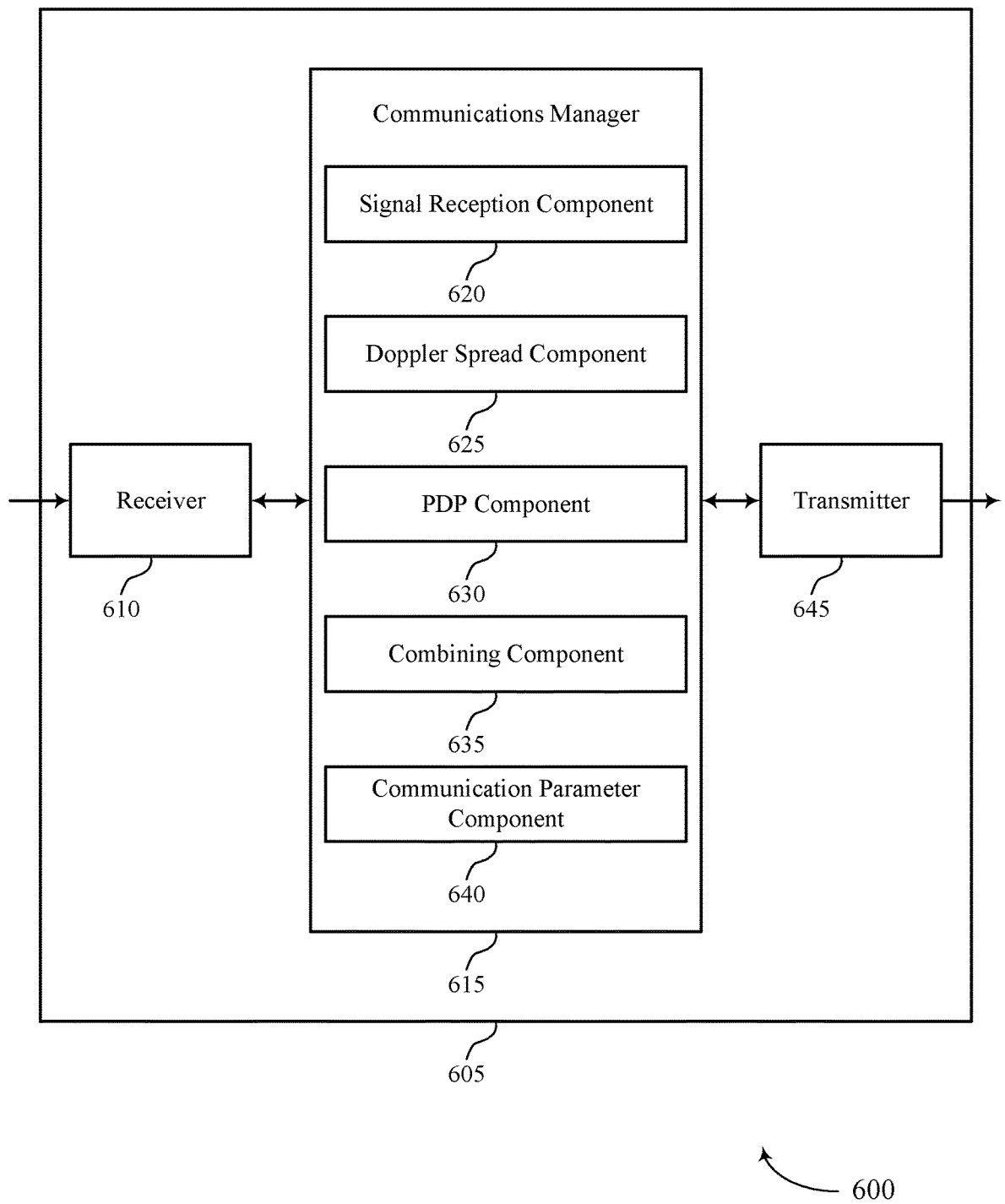

FIG. 6 shows a block diagram 600 of a device 605 that supports average environmental channel estimation in accordance with aspects of the present disclosure. The device 605 may be an example of aspects of a device 505, or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to average environmental channel estimation, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a signal reception component 620, a doppler spread component 625, a PDP component 630, a combining component 635, and a communication parameter component 640. The communications manager 615 may be an example of aspects of the communications manager 810 described herein.

The signal reception component 620 may receive, over a time period, multiple signals at the UE. The Doppler spread component 625 may estimate a Doppler spread for each subset of a set of subsets of the time period based on a first measurement of the multiple signals. The PDP component 630 may estimate, for each of the set of subsets of the time period, a PDP including an estimate of received powers over a corresponding subset of the time period based on a second measurement of the multiple signals. The combining component 635 may combine the Doppler spreads over the time period and the PDPs over the time period. The communication parameter component 640 may determine one or more communication parameters based on the combined Doppler spreads and the combined PDPs.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

A processor of a wireless device (e.g., controlling the receiver 610, the transmitter 645, or the transceiver 820 as described with reference to FIG. 8) may increase available battery power, communication quality, and data throughput. The increased communication quality may increase available battery power, communication quality, and data throughput (e.g., via implementation of system components described with reference to FIG. 7) compared to other systems and techniques, for example, that do not support estimation of one or more combined channel parameters and selection of one or more communication parameters based on the one or more combined channel parameters, which may decrease communication quality and increase power consumption. Further, the processor of the UE 115 may identify one or more aspects of the one or more combined channel parameters and/or the one or more communications parameters. The processor of the wireless device may use the one or more combined channel parameters and/or the one or more communications parameters to perform one or more actions that may result in increased communication quality, as well as save power and increase battery life at the wireless device (e.g., by strategically supporting increasing communication quality by using the one or more communication parameters), among other benefits.

Figure 7:
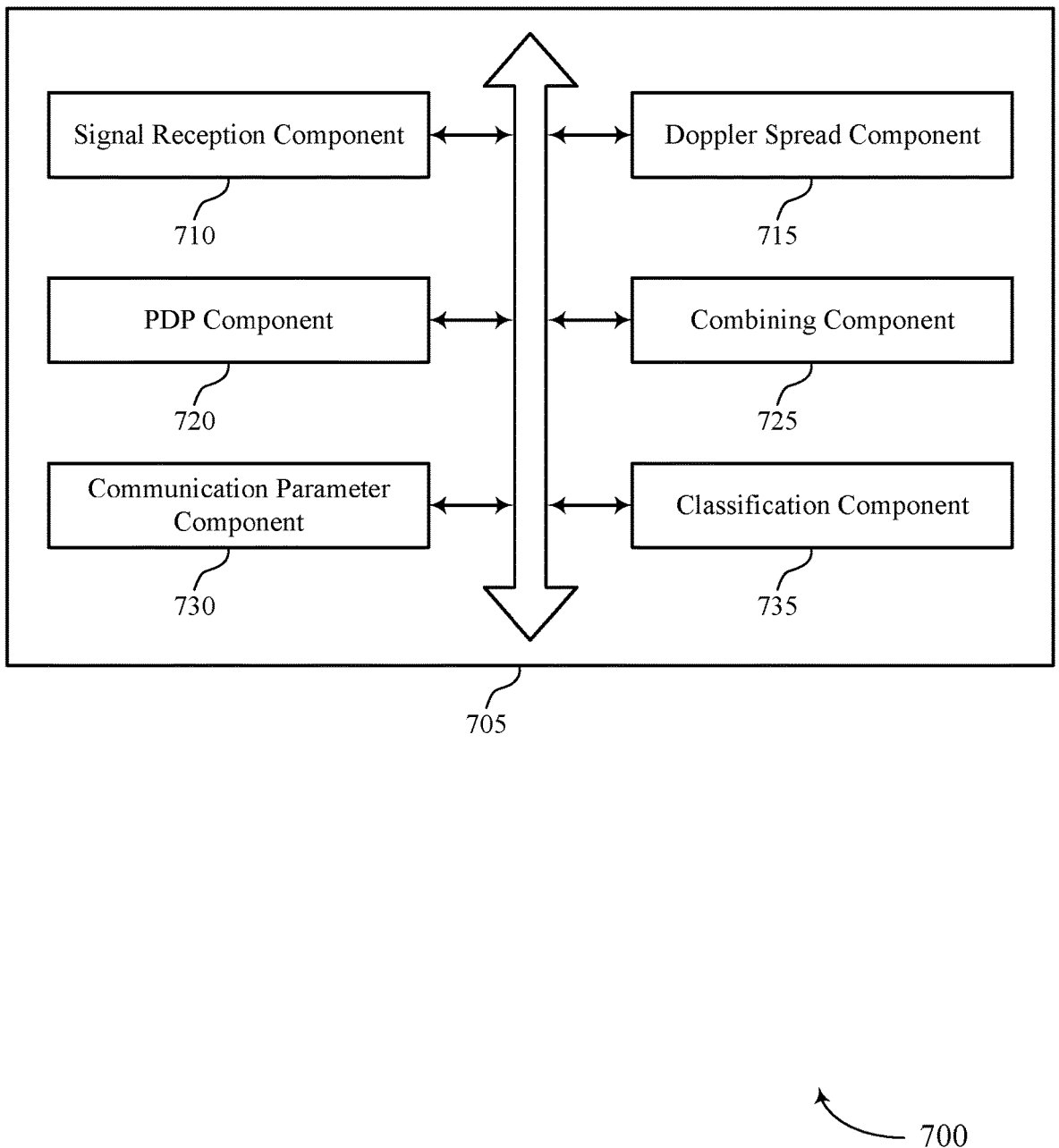
FIG. 7 shows a block diagram of a communications manager that supports average environmental channel estimation in accordance with aspects of the present disclosure.

FIG. 7 shows a block diagram 700 of a communications manager 705 that supports average environmental channel estimation in accordance with aspects of the present disclosure. The communications manager 705 may be an example of aspects of a communications manager 515, a communications manager 615, or a communications manager 810 described herein. The communications manager 705 may include a signal reception component 710, a doppler spread component 715, a PDP component 720, a combining component 725, a communication parameter component 730, and a classification component 735. Each of these modules may communicate, directly or indirectly, with one another (e.g., via one or more buses).

The signal reception component 710 may receive, over a time period, multiple signals at the UE. In some cases, the multiple signals are associated with C-V2X communications.

The Doppler spread component 715 may estimate a Doppler spread for each subset of a set of subsets of the time period based on a first measurement of the multiple signals. In some cases, the time period includes a set of subframes and each subset of the time period includes a subframe. In some examples, the Doppler spread component 715 may correlate, for each subset of the set of subsets of the time period, two DMRSs of the multiple signals.

The PDP component 720 may estimate, for each of the set of subsets of the time period, a PDP including an estimate of received powers over a corresponding subset of the time period based on a second measurement of the multiple signals. In some examples, the PDP component 720 may identify, for each subset of the set of subsets of the time period, a power peak index and a power value for received powers above a threshold based on receiving the multiple signals.

The combining component 725 may combine the Doppler spreads over the time period and the PDPs over the time period. In some examples, the combining component 725 may determine, for the time period, one or more first values characterizing the Doppler spread and one or more second values characterizing the PDP.

The communication parameter component 730 may determine one or more communication parameters based on the combined Doppler spreads and the combined PDPs. In some examples, the communication parameter component 730 may determine, based on the combined PDPs, a first location in a time domain associated with communication of a signal and a second location in the time domain associated with noise reception.

In some examples, the communication parameter component 730 may identify a delay spread based on the combined PDPs. In some examples, the communication parameter component 730 may determine one or more reception parameters based on the delay spread, the combined doppler spreads, or any combination thereof. In some cases, the one or more reception parameters include a filter value. In some examples, the communication parameter component 730 may select a transmission scheme based on the combined Doppler spreads, the combined PDPs, or any combination thereof.

The classification component 735 may identify a classification associated with the multiple signals based on the one or more first values, the one or more second values, or any combination thereof. In some examples, the classification component 735 may determine whether the one or more first values satisfy a first threshold, where identifying the classification is based on determining whether the one or more first values satisfy the first threshold. In some examples, the classification component 735 may determine whether to combine information from two or more DMRSs over two or more symbols based on the classification.

In some examples, the classification component 735 may determine whether the one or more second values satisfy a second threshold, where identifying the classification is based on determining whether the one or more second values satisfy the second threshold. In some examples, the classification component 735 may determine whether to combine information from two or more resource elements in a same symbol based on the classification.

In some examples, the classification component 735 may identify, for the time period, one or more classifications associated with the multiple signals based on the combined Doppler spreads and the combined PDPs. In some examples, the classification component 735 may identify, for the time period, a communication environment classification based on the combined PDPs and a mobility classification based on the combined Doppler spreads, where the mobility classification includes a dynamic classification or a static classification and the communication environment classification includes a rural classification or an urban classification.

In some examples, the classification component 735 may determine a majority vote for the one or more classifications. In some examples, the classification component 735 may determine, for the time period, a first number of Doppler spreads above a first threshold. In some examples, the classification component 735 may determine, for the time period, a second number of PDPs above a second threshold. In some examples, the classification component 735 may identify, for the time period, the one or more classifications based on the second number of PDPs and the first number of Doppler spreads.

Figure 8:
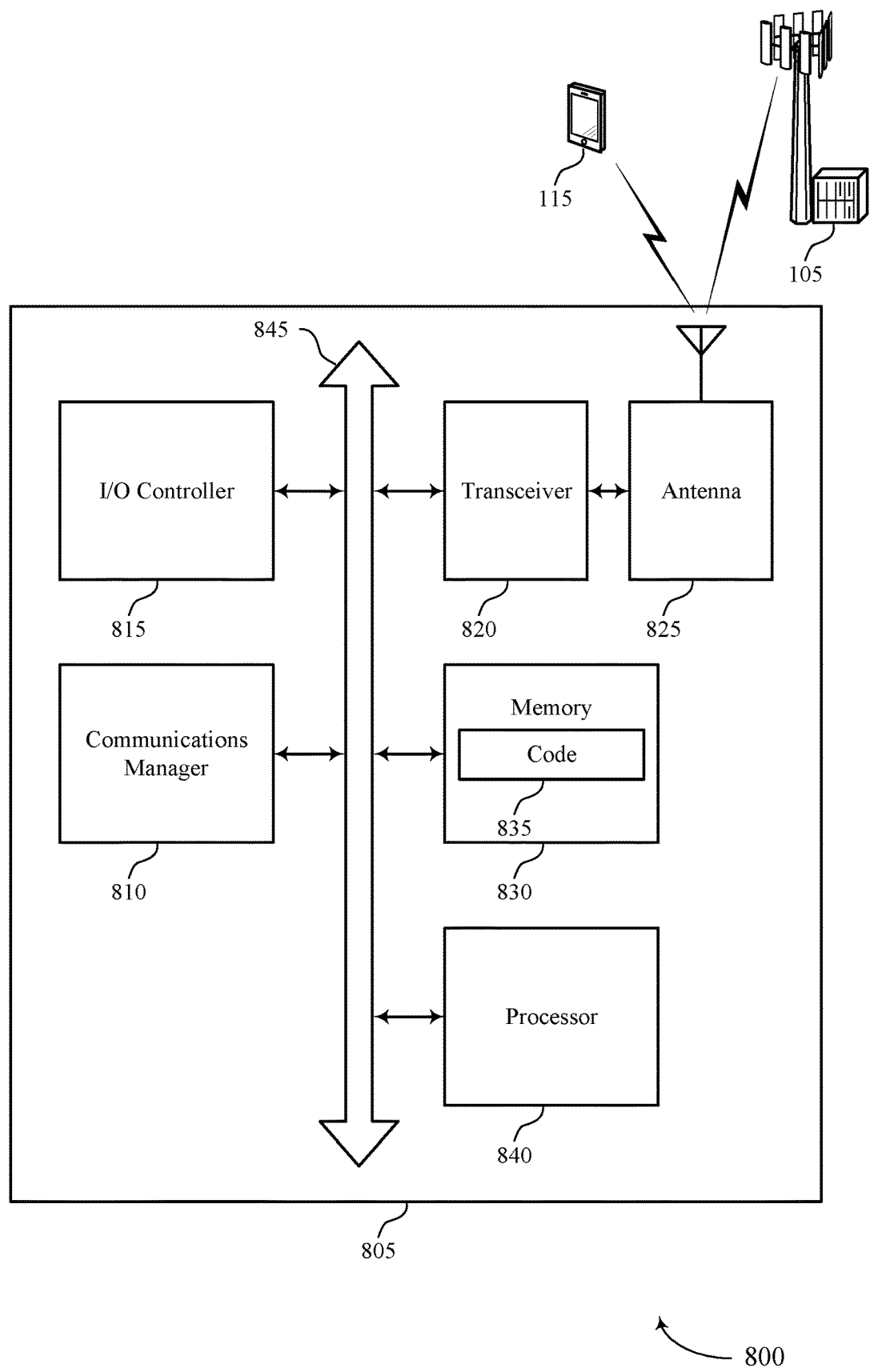
FIG. 8 shows a diagram of a system including a device that supports average environmental channel estimation in accordance with aspects of the present disclosure.

FIG. 8 shows a diagram of a system 800 including a device 805 that supports average environmental channel estimation in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, over a time period, multiple signals at the UE, estimate a Doppler spread for each subset of a set of subsets of the time period based on a first measurement of the multiple signals, estimate, for each of the set of subsets of the time period, a PDP including an estimate of received powers over a corresponding subset of the time period based on a second measurement of the multiple signals, combine the Doppler spreads over the time period and the PDPs over the time period, and determine one or more communication parameters based on the combined Doppler spreads and the combined PDPs.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting average environmental channel estimation).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
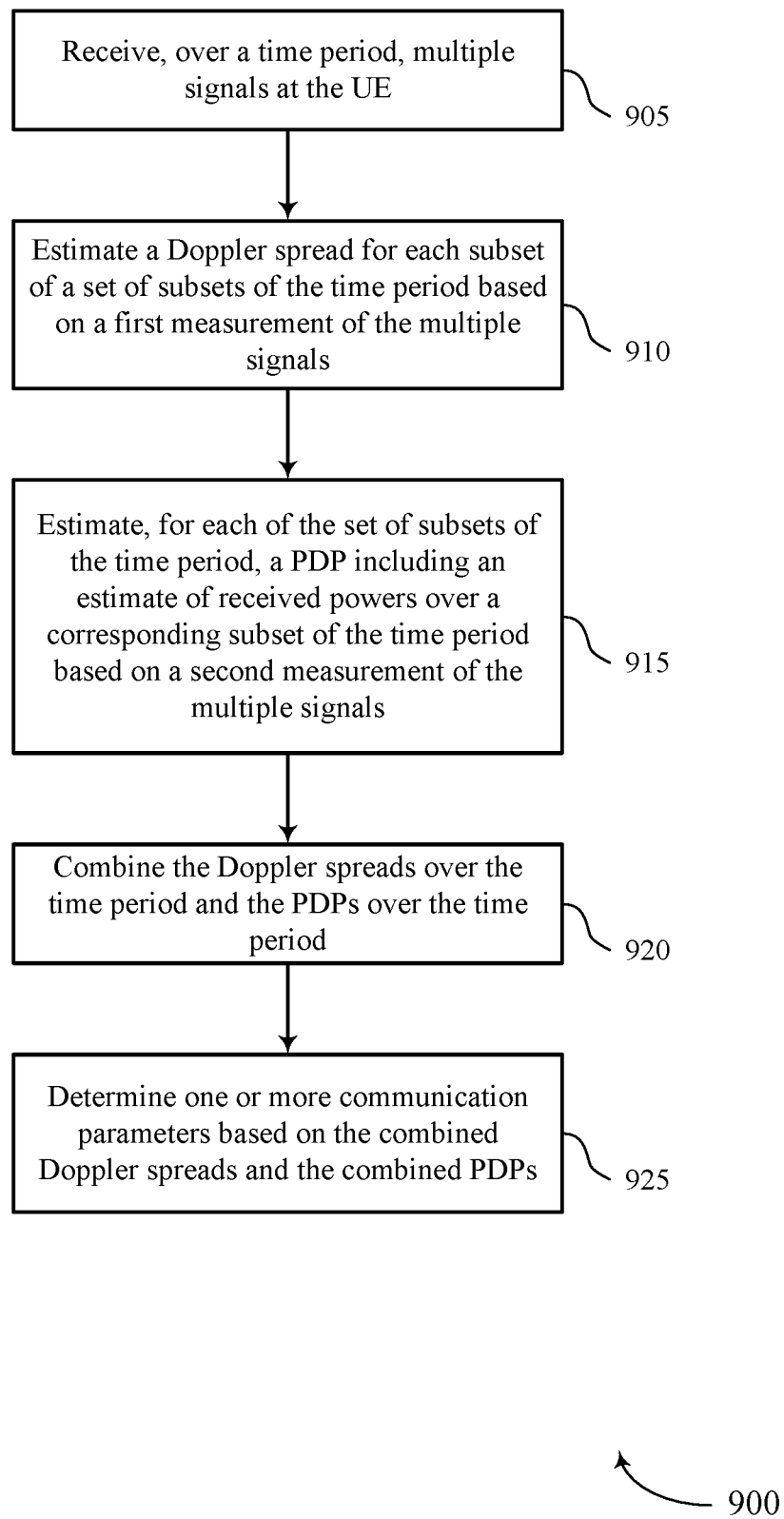
FIGS. 9 and 10 show flowcharts illustrating methods that support average environmental channel estimation in accordance with aspects of the present disclosure.

FIG. 9 shows a flowchart illustrating a method 900 that supports average environmental channel estimation in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive, over a time period, multiple signals at the UE. The operations of 905 may be performed according to the methods described herein. In some examples, aspects of the operations of 905 may be performed by a signal reception component as described with reference to FIGS. 5 through 8.

At 910, the UE may estimate a Doppler spread for each subset of a set of subsets of the time period based on a first measurement of the multiple signals. The operations of 910 may be performed according to the methods described herein. In some examples, aspects of the operations of 910 may be performed by a Doppler spread component as described with reference to FIGS. 5 through 8.

At 915, the UE may estimate, for each of the set of subsets of the time period, a PDP including an estimate of received powers over a corresponding subset of the time period based on a second measurement of the multiple signals. The operations of 915 may be performed according to the methods described herein. In some examples, aspects of the operations of 915 may be performed by a PDP component as described with reference to FIGS. 5 through 8.

At 920, the UE may combine the Doppler spreads over the time period and the PDPs over the time period. The operations of 920 may be performed according to the methods described herein. In some examples, aspects of the operations of 920 may be performed by a combining component as described with reference to FIGS. 5 through 8.

At 925, the UE may determine one or more communication parameters based on the combined Doppler spreads and the combined PDPs. The operations of 925 may be performed according to the methods described herein. In some examples, aspects of the operations of 925 may be performed by a communication parameter component as described with reference to FIGS. 5 through 8.

Figure 10:
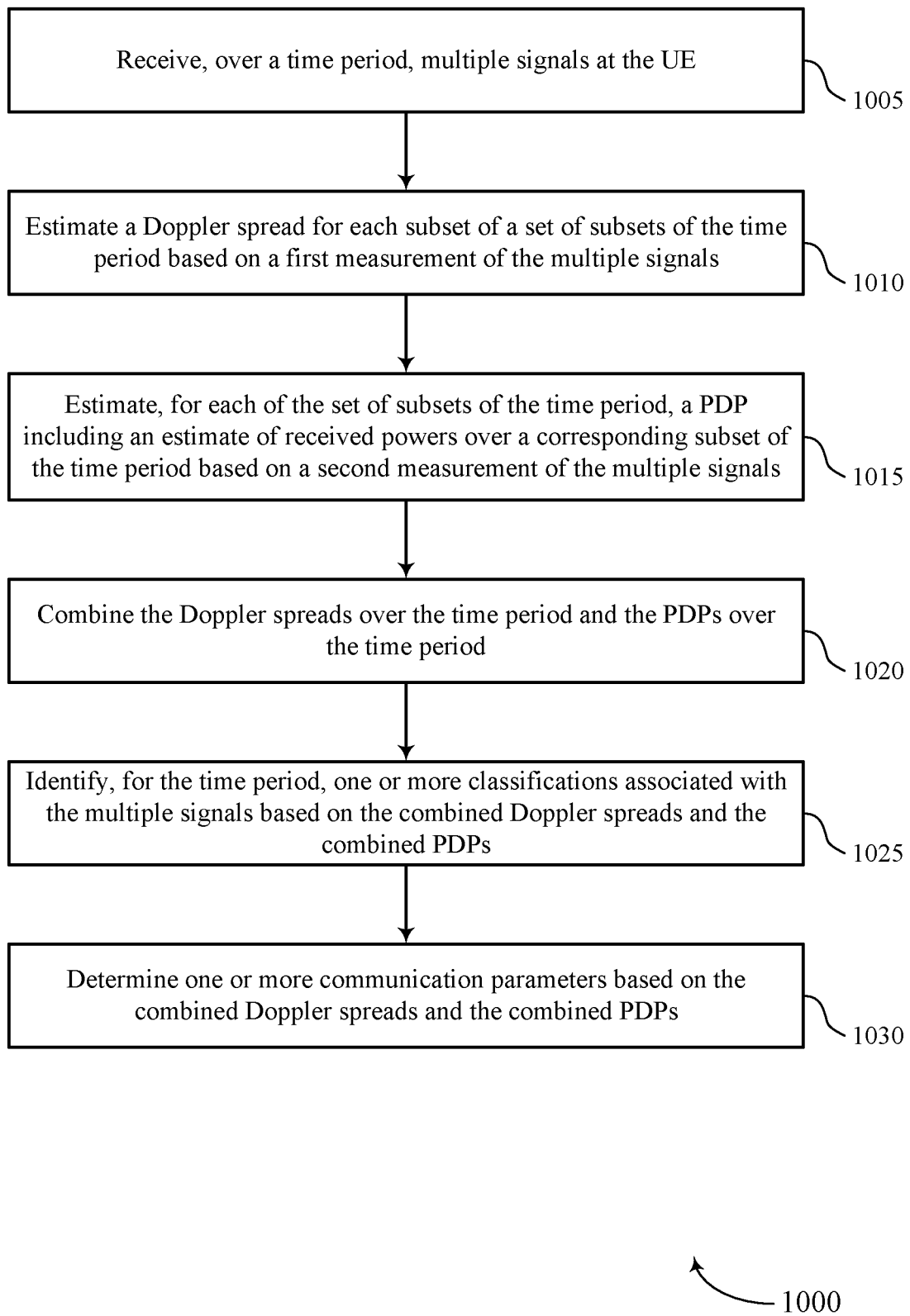

FIG. 10 shows a flowchart illustrating a method 1000 that supports average environmental channel estimation in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may receive, over a time period, multiple signals at the UE. The operations of 1005 may be performed according to the methods described herein. In some examples, aspects of the operations of 1005 may be performed by a signal reception component as described with reference to FIGS. 5 through 8.

At 1010, the UE may estimate a Doppler spread for each subset of a set of subsets of the time period based on a first measurement of the multiple signals. The operations of 1010 may be performed according to the methods described herein. In some examples, aspects of the operations of 1010 may be performed by a Doppler spread component as described with reference to FIGS. 5 through 8.

At 1015, the UE may estimate, for each of the set of subsets of the time period, a PDP including an estimate of received powers over a corresponding subset of the time period based on a second measurement of the multiple signals. The operations of 1015 may be performed according to the methods described herein. In some examples, aspects of the operations of 1015 may be performed by a PDP component as described with reference to FIGS. 5 through 8.

At 1020, the UE may combine the Doppler spreads over the time period and the PDPs over the time period. The operations of 1020 may be performed according to the methods described herein. In some examples, aspects of the operations of 1020 may be performed by a combining component as described with reference to FIGS. 5 through 8.

At 1025, the UE may identify, for the time period, one or more classifications associated with the multiple signals based on the combined Doppler spreads and the combined PDPs. The operations of 1025 may be performed according to the methods described herein. In some examples, aspects of the operations of 1025 may be performed by a classification component as described with reference to FIGS. 5 through 8.

At 1030, the UE may determine one or more communication parameters based on the combined Doppler spreads and the combined PDPs. The operations of 1030 may be performed according to the methods described herein. In some examples, aspects of the operations of 1030 may be performed by a communication parameter component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, over a time period, a plurality of signals at the UE;
   estimating a plurality of Doppler spreads corresponding to each subset of a plurality of subsets of the time period based at least in part on a first measurement of the plurality of signals;
   estimating a plurality of power delay profiles corresponding to each subset of the plurality of subsets of the time period, a power delay profile of the plurality of power delay profiles comprising an estimate of received powers over a corresponding subset of the time period based at least in part on a second measurement of the plurality of signals;
   combining the plurality of estimated Doppler spreads over the time period and the plurality of estimated power delay profiles over the time period; and
   determining one or more communication parameters based at least in part on the combined plurality of estimated Doppler spreads and the combined plurality of estimated power delay profiles.

2. The method of claim 1, wherein combining the plurality of estimated Doppler spreads over the time period and the plurality of estimated power delay profiles over the time period comprises:

determining, for the time period, one or more first values characterizing the plurality of estimated Doppler spreads and one or more second values characterizing the plurality of estimated power delay profiles.

3. The method of claim 2, wherein determining the one or more communication parameters comprises:
identifying a classification associated with the plurality of signals based at least in part on the one or more first values, the one or more second values, or any combination thereof.

4. The method of claim 3, further comprising:
determining whether the one or more first values satisfy a first threshold, wherein identifying the classification is based at least in part on determining whether the one or more first values satisfy the first threshold; and
determining whether to combine information from two or more demodulation reference signals over two or more symbols based at least in part on the classification.

5. The method of claim 3, further comprising:
determining whether the one or more second values satisfy a second threshold, wherein identifying the classification is based at least in part on determining whether the one or more second values satisfy the second threshold; and
determining whether to combine information from two or more resource elements in a same symbol based at least in part on the classification.

6. The method of claim 1, further comprising:
identifying, for the time period, one or more classifications associated with the plurality of signals based at least in part on the combined plurality of estimated Doppler spreads and the combined plurality of estimated power delay profiles.

7. The method of claim 6, wherein identifying the one or more classifications comprises:
identifying, for the time period, a communication environment classification based at least in part on the combined power delay profiles and a mobility classification based at least in part on the combined plurality of estimated Doppler spreads, wherein the mobility classification comprises a dynamic classification or a static classification and the communication environment classification comprises a rural classification or an urban classification.

8. The method of claim 6, wherein identifying the one or more classifications comprises:
determining a majority vote for the one or more classifications.

9. The method of claim 8, wherein determining the majority vote comprises:
determining, for the time period, a first quantity of estimated Doppler spreads of the plurality of estimated Doppler spreads that are above a first threshold;
determining, for the time period, a second quantity of estimated power delay profiles of the plurality of estimated power delay profiles that are above a second threshold; and
identifying, for the time period, the one or more classifications based at least in part on the second quantity and the first quantity.

10. The method of claim 1, wherein determining the one or more communication parameters comprises:
determining, based at least in part on the combined plurality of estimated power delay profiles, a first location in a time domain associated with communication of a signal and a second location in the time domain associated with noise reception.

11. The method of claim 1, wherein determining the one or more communication parameters comprises:
identifying a delay spread based at least in part on the combined plurality of estimated power delay profiles; and
determining one or more reception parameters based at least in part on the delay spread, the combined plurality of estimated Doppler spreads, or any combination thereof.

12. The method of claim 11, wherein the one or more reception parameters comprise a filter value.

13. The method of claim 1, wherein determining the one or more communication parameters comprises:
selecting a transmission scheme based at least in part on the combined plurality of estimated Doppler spreads, the combined plurality of estimated power delay profiles, or any combination thereof.

14. The method of claim 1, wherein estimating the plurality of Doppler spreads comprises:
correlating, for each subset of the plurality of subsets of the time period, two demodulation reference signals of the plurality of signals.

15. The method of claim 1, wherein estimating the plurality of power delay profiles comprises:
identifying, for each subset of the plurality of subsets of the time period, a power peak index and a power value for received powers above a threshold based at least in part on receiving the plurality of signals.

16. The method of claim 1, wherein the time period comprises a plurality of subframes and each subset of the time period comprises a subframe.

17. The method of claim 1, wherein the plurality of signals is associated with cellular vehicle to everything (C-V2X) communications.

18. An apparatus for wireless communications at a user equipment (UE), comprising:
a processor,
memory coupled with the processor; and
instructions stored in the memory and executable by the processor to cause the apparatus to:
receive, over a time period, a plurality of signals at the UE;
estimate a plurality of Doppler spreads corresponding to each subset of a plurality of subsets of the time period based at least in part on a first measurement of the plurality of signals;
estimate a plurality of power delay profiles corresponding to each subset of the plurality of subsets of the time period, a power delay profile of the plurality of power delay profiles comprising an estimate of received powers over a corresponding subset of the time period based at least in part on a second measurement of the plurality of signals;
combine the plurality of estimated Doppler spreads over the time period and the plurality of estimated power delay profiles over the time period; and
determine one or more communication parameters based at least in part on the combined plurality of estimated Doppler spreads and the combined plurality of estimated power delay profiles.

19. The apparatus of claim 18, wherein the instructions to combine the plurality of estimated Doppler spreads over the time period and the plurality of estimated power delay profiles over the time period are executable by the processor to cause the apparatus to:
determine, for the time period, one or more first values characterizing the plurality of estimated Doppler spreads and one or more second values characterizing the plurality of estimated power delay profiles.

20. The apparatus of claim 19, wherein the instructions to determine the one or more communication parameters are executable by the processor to cause the apparatus to:
identify a classification associated with the plurality of signals based at least in part on the one or more first values, the one or more second values, or any combination thereof.

21. The apparatus of claim 20, wherein the instructions are further executable by the processor to cause the apparatus to:
determine whether the one or more first values satisfy a first threshold, wherein identifying the classification is based at least in part on determining whether the one or more first values satisfy the first threshold; and
determine whether to combine information from two or more demodulation reference signals over two or more symbols based at least in part on the classification.

22. The apparatus of claim 20, wherein the instructions are further executable by the processor to cause the apparatus to:
determine whether the one or more second values satisfy a second threshold, wherein identifying the classification is based at least in part on determining whether the one or more second values satisfy the second threshold; and
determine whether to combine information from two or more resource elements in a same symbol based at least in part on the classification.

23. The apparatus of claim 18, wherein the instructions are further executable by the processor to cause the apparatus to:
identify, for the time period, one or more classifications associated with the plurality of signals based at least in part on the combined plurality of estimated Doppler spreads and the combined plurality of estimated power delay profiles Doppler spreads and the combined power delay profiles.

24. The apparatus of claim 23, wherein the instructions to identify the one or more classifications are executable by the processor to cause the apparatus to:
identify, for the time period, a communication environment classification based at least in part on the combined power delay profiles and a mobility classification based at least in part on the combined plurality of estimated Doppler spreads, wherein the mobility classification comprises a dynamic classification or a static classification and the communication environment classification comprises a rural classification or an urban classification.

25. The apparatus of claim 23, wherein the instructions to identify the one or more classifications are executable by the processor to cause the apparatus to:
determine a majority vote for the one or more classifications.

26. The apparatus of claim 25, wherein the instructions to determine the majority vote are executable by the processor to cause the apparatus to:
determine, for the time period, a first quantity of estimated Doppler spreads of the plurality of estimated Doppler spreads that are above a first threshold;
determine, for the time period, a second quantity of estimated power delay profiles of the plurality of estimated power delay profiles that are above a second threshold; and identify, for the time period, the one or more classifications based at least in part on the second quantity and the first quantity.

27. The apparatus of claim 18, wherein the instructions to determine the one or more communication parameters are executable by the processor to cause the apparatus to:
identify a delay spread based at least in part on the combined plurality of estimated power delay profiles; and
determine one or more reception parameters based at least in part on the delay spread, the combined plurality of estimated Doppler spreads, or any combination thereof.

28. The apparatus of claim 18, wherein the instructions to determine the one or more communication parameters are executable by the processor to cause the apparatus to:
select a transmission scheme based at least in part on the combined plurality of estimated Doppler spreads, the combined plurality of estimated power delay profiles, or any combination thereof.

29. An apparatus for wireless communications at a user equipment (UE), comprising:
means for receiving, over a time period, a plurality of signals at the UE;
means for estimating a plurality of Doppler spreads corresponding to each subset of a plurality of subsets of the time period based at least in part on a first measurement of the plurality of signals;
means for estimating a plurality of power delay profiles corresponding to each subset of the plurality of subsets of the time period, a power delay profile of the plurality of power delay profiles comprising an estimate of received powers over a corresponding subset of the time period based at least in part on a second measurement of the plurality of signals;
means for combining the plurality of estimated Doppler spreads over the time period and the plurality of estimated power delay profiles over the time period; and
means for determining one or more communication parameters based at least in part on the combined plurality of estimated Doppler spreads and the combined plurality of estimated power delay profiles.

30. A non-transitory computer-readable medium storing code for wireless communications at a user equipment (UE), the code comprising instructions executable by a processor to:
receive, over a time period, a plurality of signals at the UE;
estimate a plurality of Doppler spreads corresponding to each subset of a plurality of subsets of the time period based at least in part on a first measurement of the plurality of signals;
estimate a plurality of power delay profiles corresponding to each subset of the plurality of subsets of the time period, a power delay profile of the plurality of power delay profiles comprising an estimate of received powers over a corresponding subset of the time period based at least in part on a second measurement of the plurality of signals;
combine the plurality of estimated Doppler spreads over the time period and the plurality of estimated power delay profiles over the time period; and
determine one or more communication parameters based at least in part on the combined plurality of estimated Doppler spreads and the combined plurality of estimated power delay profiles.

* * * * *